(12) United States Patent
Harada et al.

(10) Patent No.: US 8,880,481 B1
(45) Date of Patent: Nov. 4, 2014

(54) INVERSE DISTRIBUTION FUNCTION OPERATIONS IN A PARALLEL RELATIONAL DATABASE

(75) Inventors: Hitoshi Harada, Foster City, CA (US); Caleb E. Welton, Foster City, CA (US); Gavin Sherry, Beaune (FR)

(73) Assignee: Pivotal Software, Inc., Palo Alto, CA (US)

( * ) Notice: Subject to any disclaimer, the term of this patent is extended or adjusted under 35 U.S.C. 154(b) by 175 days.

(21) Appl. No.: 13/434,442

(22) Filed: Mar. 29, 2012

(51) Int. Cl.
*G06F 17/30* (2006.01)

(52) U.S. Cl.
USPC .......................................................... 707/692

(58) Field of Classification Search
USPC .......................................................... 707/692
See application file for complete search history.

(56) References Cited

U.S. PATENT DOCUMENTS

| | | | |
|---|---|---|---|
| 6,775,682 B1 * | 8/2004 | Ballamkonda et al. | 1/1 |
| 7,035,843 B1 * | 4/2006 | Bellamkonda et al. | 1/1 |
| 7,171,427 B2 * | 1/2007 | Witkowski et al. | 1/1 |
| 7,228,309 B1 * | 6/2007 | Fisher | 1/1 |
| 7,783,648 B2 * | 8/2010 | Bateni et al. | 707/752 |
| 7,873,840 B2 * | 1/2011 | Agrawal et al. | 713/193 |
| 8,042,073 B1 * | 10/2011 | Nnaji | 716/101 |
| 8,234,468 B1 * | 7/2012 | Deshmukh et al. | 711/162 |
| 2003/0171876 A1 * | 9/2003 | Markowitz et al. | 702/20 |
| 2004/0006574 A1 * | 1/2004 | Witkowski et al. | 707/104.1 |
| 2004/0034616 A1 * | 2/2004 | Witkowski et al. | 707/1 |
| 2006/0106835 A1 * | 5/2006 | Murray et al. | 707/100 |
| 2007/0239794 A1 * | 10/2007 | Metzner | 707/200 |

OTHER PUBLICATIONS

Tikhonova et al., "Parallel Algorithms in STAPL: Sorting and the Selection Problem," Parasol Lab, Texas A&M, Aug. 2005, 9 pages.

* cited by examiner

*Primary Examiner* — Jean M Corrielus
(74) *Attorney, Agent, or Firm* — Fish & Richardson P.C.

(57) ABSTRACT

Inverse distribution operations are performed on a large distributed parallel database comprising a plurality of distributed data segments to determine a data value at a predetermined percentile of a sorted dataset formed on one segment. Data elements from across the segments may be first grouped, either by partitioning keys or by hashing, the groups are sorted into a predetermined order, and data values corresponding to the desired percentile are picked up at a row location of the corresponding data element of each group. For a global dataset that is spread across the database segments, a local sort of data elements is performed on each segment, and the data elements from the local sorts are streamed in overall sorted order to one segment to form the sorted dataset.

20 Claims, 11 Drawing Sheets

INVERSE DISTRIBUTION FUNCTION OPERATIONS IN A PARALLEL RELATIONAL DATABASE

BACKGROUND

This invention relates generally to analyzing the data population of a dataset to determine information that characterizes the data population, and more particularly to determining the data values at predetermined percentiles of a data population that is distributed across multiple nodes of a distributed parallel database.

It is frequently desirable to characterize the data in a data population in order to better understand the nature of the data. Important characteristics of the data population include data values which occur at certain percentile levels. For example, determining data values at the median ($50^{th}$ percentile), the $90^{th}$ percentile, or the $99^{th}$ percentile levels is important, especially for financial data as to satisfy legal reporting and regulatory requirements, because percentile values allow insight into the underlying data and permit the data to be summarized meaningfully. Percentile values are determined using inverse distribution functions which are different from other types of mathematical calculations that characterize a data distribution as they produce the actual real data values in the data distribution at desired percentiles. The median, for instance, of a data distribution is different from the average because it produces the real value of the middle data element in the distribution. Moreover, it is unaffected by an outlying value that could significantly skew the average value.

While performing inverse distribution operations to determine the data values at selected percentiles on a small dataset is relatively straightforward, doing so on a large parallel database where the data is distributed across clusters of multiple computers is exceptionally difficult. This is because there is an ordering constraint upon the data population which requires getting the data into a particular order before percentile levels can be determined. It is not possible to calculate inverse distribution functions in parallel on separate subsets of data and combine the answers in a way to derive correct results for the overall dataset. The median of a data distribution, for instance, is not equal to the median of medians. Ordering of the data in a large distributed parallel database has not generally been possible in a way that does not revisit the data multiple times or require massive movements of large amounts of data. Accordingly, known approaches to performing inverse distribution function operations on parallel databases are inefficient, costly and difficult.

It is desirable to provide systems and methods which address the foregoing and other known problems of characterizing distributed datasets by enabling inverse distribution operations to determine data values at selected percentile levels of a data population that is distributed across multiple nodes of a parallel database system efficiently and cost effectively, and it is to these ends that the present invention is directed.

DESCRIPTION OF PREFERRED EMBODIMENTS

The invention is particularly well adapted for characterizing the data distribution of a dataset in a large parallel distributed relational database, such as a shared nothing database system, using inverse distribution function processes to determine data values at selected percentile levels, and will be described in that context. It will be appreciated, however, that this is illustrative of only one utility of the invention, and that the invention may be employed with other types of database systems and for other types of operations.

Figure 1:
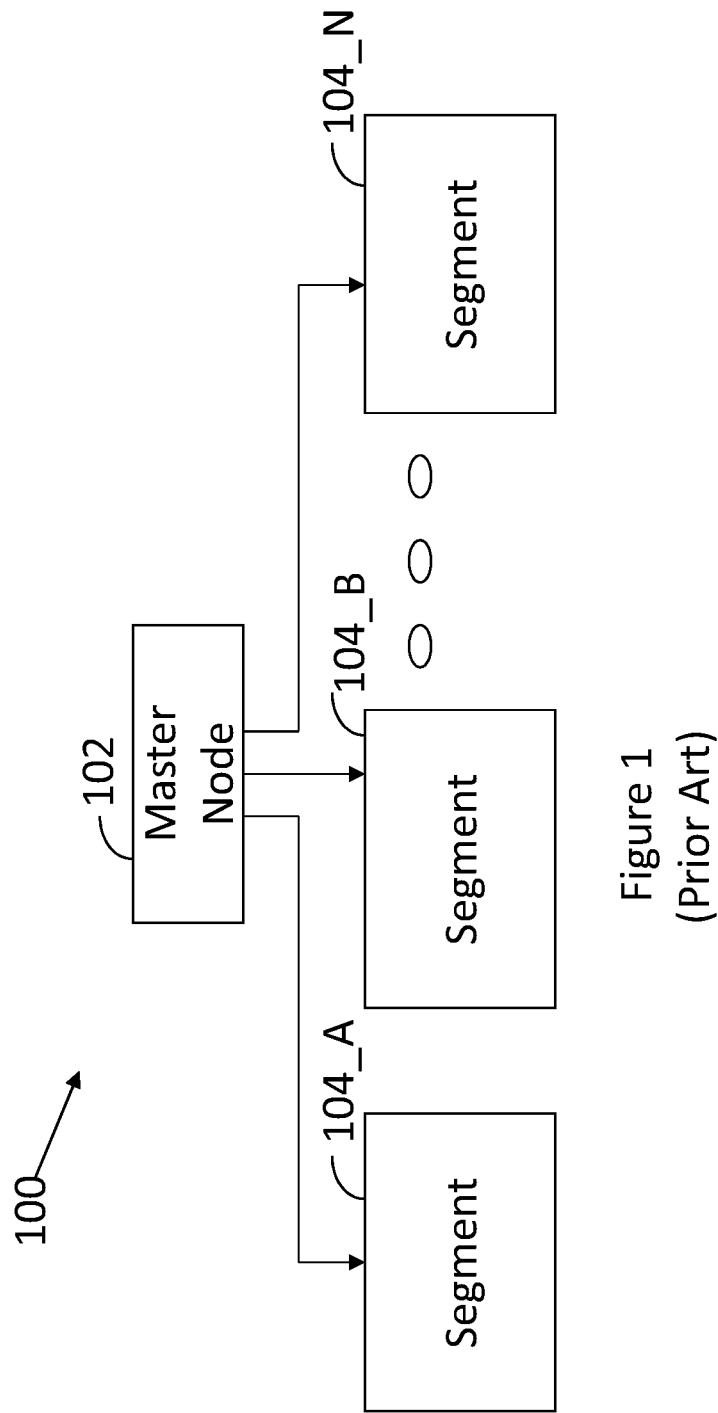
FIG. 1 illustrates the architecture one type of a parallel distributed database system in which the invention may be employed.

FIG. 1 illustrates the architecture of a shared nothing database system 100 comprising one type of a parallel distributed database system 100 in which the invention may be employed. The database may include a master node 102 which connects to a plurality of segment nodes 104_A through 104_N. Each segment node may comprise one or more database (DB) segments (database instances), including one or more primary databases and one or more mirror databases. For fault tolerance purposes, a primary database segment and its corresponding mirror database segment may be located on different nodes. The master and segment nodes may comprise generally similar server applications having the same process model as a standalone server that is augmented with extensions for a distributed system, such as data distribution, remote process communications, and data replication between primary-mirror pairs.

Figure 2:
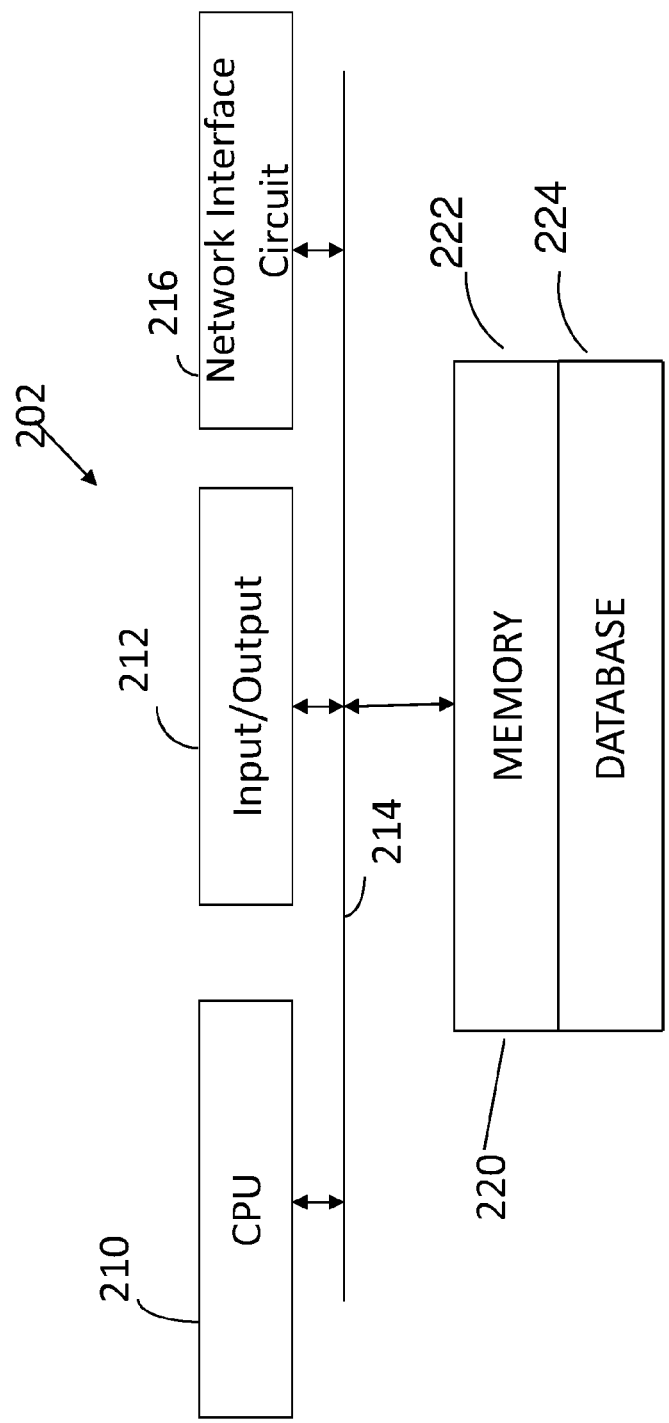
FIG. 2 is a block diagram illustrating an embodiment of a node of the database system of FIG. 1.

FIG. 2 illustrates an example of the architecture of a node 202 of the database system that is configured to perform processes and operations in accordance with the invention. The master node and the segment nodes may have similar architectures. The node 202 may comprise a host computer server system 210 (which may comprise a single CPU or a multi-processor system comprising a plurality of CPUs) connected to input/output (I/O) devices 212 by a bus 214. The I/O devices may be standard computer system input and output devices. One or more network interface circuits 216 may also be connected to bus 214 to allow the node to operate in the networked environment of the parallel distributed database system of FIG. 1. The node may further have storage 220 comprising non-transitory physical storage media connected to the bus that stores executable instructions to control the operations of the computer system. Storage 220 may include a main memory 222 comprising instructions that control the CPU to operate in accordance with the invention, as will be described, and may contain other storage 224 for storing a database instance.

Figure 3:
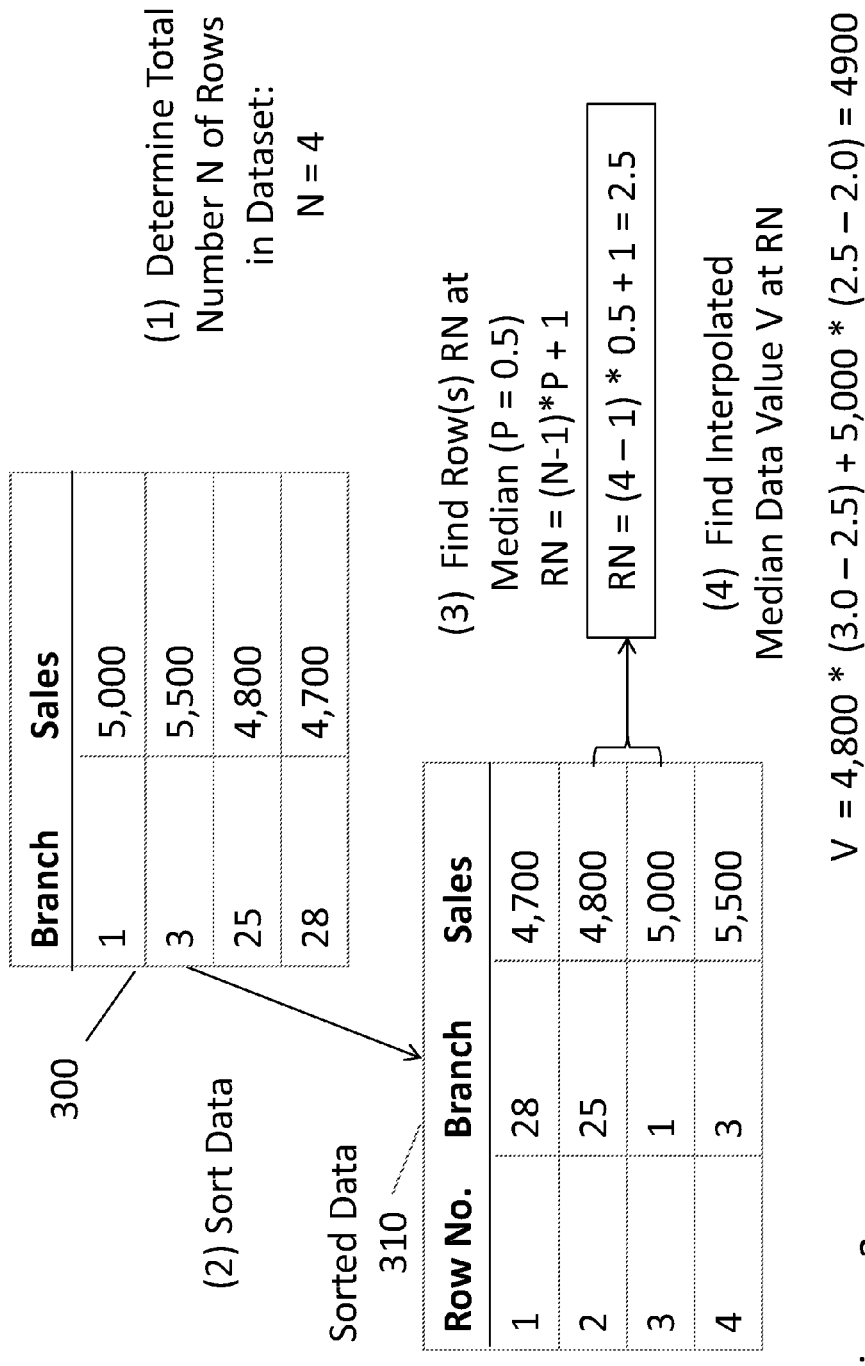
FIG. 3 is an overview of an inverse distribution function operation by which data values in a dataset at selected percentiles can be determined.

SQL databases provide a standard process "percentile_cont" that can be used to apply an inverse distribution function operation to a dataset to determine the data value at a predetermined percentile level (P) in an ordered set of data comprising N rows, i.e., records. FIG. 3 illustrates diagrammatically the inverse distribution function operation. A row number RN of a row in an ordered set of data containing the data value corresponding to the desired percentile level P is determined according to the relationship $RN=(N-1)*P+1$, and the data value V at row RN is determined by linear interpolation between the values in a row above and a row below RN if RN falls between rows. FIG. 3 illustrates the process for determining the data value at the P=0.5 ($50^{th}$ percentile) level, which is known as the median. The median is the data value at the middle of an ordered set of data. FIG. 3 illustrates determining the median value of sales within a dataset of branch sales data as shown in table 300. The first step is to determine the number N of rows in the dataset. In the example of FIG. 3, N=4. At step 2 the data is sorted by sales to produce a sort ordered dataset 310, and at step 3 row number RN of the median value of sales is determined using the above relationship. In the example shown, RN=2.5, which occurs midway between the second and third rows in table 310. Accordingly, the median data value V is determined by linear interpolation, as shown, to be 4900. In the description that follows, for convenience and simplicity, and without the loss of generality, the invention will be described with respect to analyzing a dataset for the "median" or $50^{th}$ percentile level. It will be appreciated, however, that the invention is equally applicable to determining data values at any other desired percentile levels.

While the process illustrated in FIG. 3 for determining a percentile value is relatively straightforward for a dataset that is centrally located in a one database, it is difficult to apply inverse distribution function processes in a large distributed parallel database system where the data is distributed across multiple computing clusters because of the need to first sort the relevant dataset into a predetermined order. In a large distributed database system, this may require moving massive amounts of data between clusters, which is very costly and inefficient. The invention addresses this problem by providing very efficient and relatively low cost processes for performing inverse distribution operations on a distributed parallel database.

The invention, broadly summarized, determines the number of elements (rows or values) in a relevant dataset, collects or sorts the data into a prescribed order, and determines the data value(s) at the element or row numbers of the ordered data corresponding to the desired percentile(s), as by counting the number of elements or rows into the ordered dataset and picking up the data values at the appropriate row numbers. Depending upon the nature and characteristics of the data, and the information desired, the invention may accomplish this in somewhat different ways, as will be described.

Figure 4:
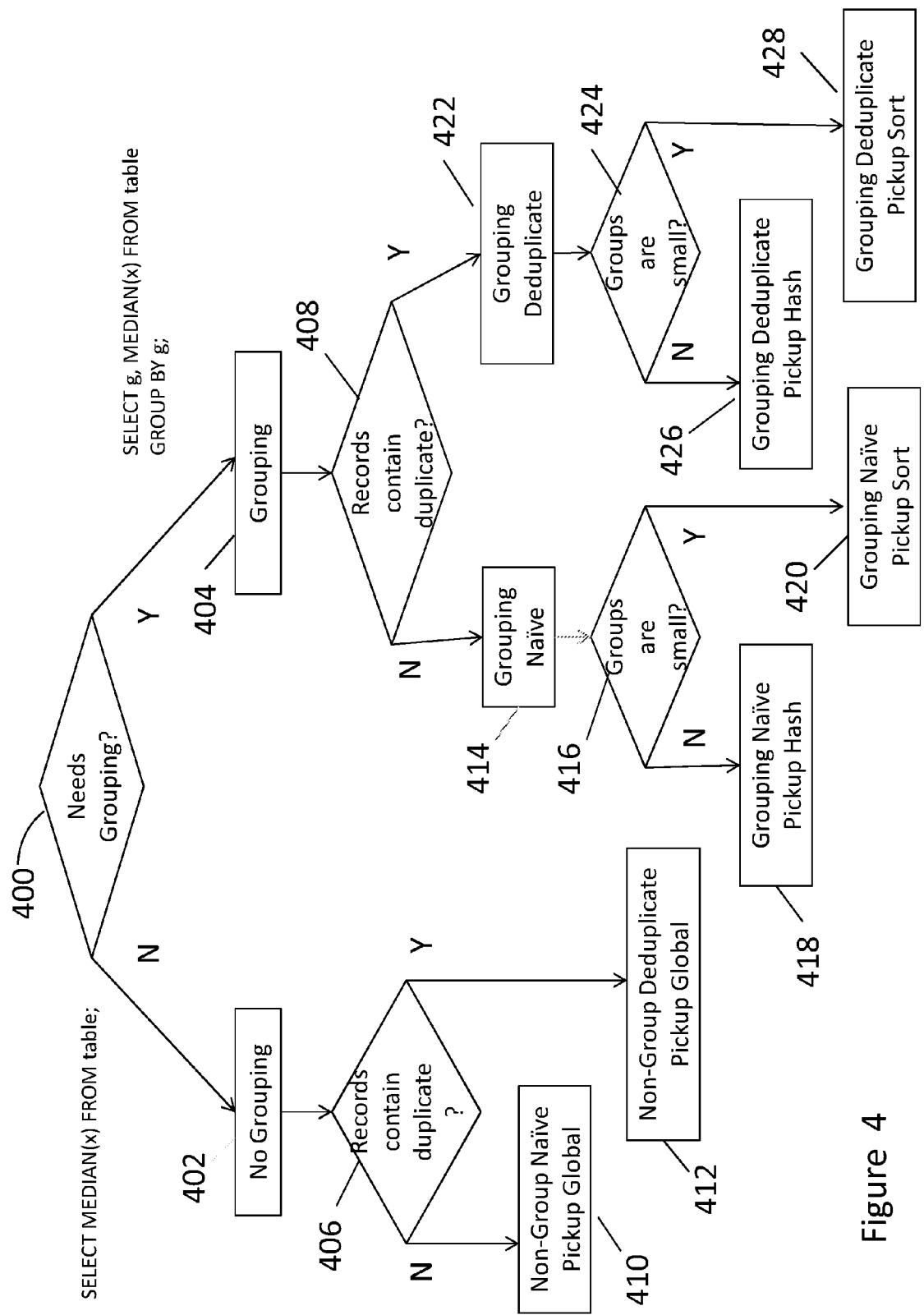
FIG. 4 is a diagrammatic view illustrating a method for initially determining the type of inverse distribution operation to be applied to a dataset.

FIG. 4 illustrates a process which a database user may perform preliminarily for selecting an appropriate approach for analyzing a dataset based upon the characteristics of the dataset and the information desired. At 400, the user may first determine whether no data grouping (402) or whether data grouping (404) will be used. By "grouping" or "grouped" as used herein is meant whether the data is organized into a plurality of separate groups (datasets), each of which is characterized by an inverse distribution process. No grouping means the dataset comprises one large "global" group which is analyzed and characterized as a unit. Whether or not grouping is used may depend upon the nature of data and the query. A query that seeks the median of sales worldwide, for example, will analyze all of the sales data as one large global group, whereas a query that seeks the medians of sales in different regions will analyze separate groups (datasets), one for each region, and obtain a median for each group.

Next, at 406 and 408, determinations may be made as to whether the records in the datasets contain duplicate values. If they contain a significant numbers of duplicates, a de-duplication process (which will be described below in connection with FIG. 8) may be employed to reduce the number of duplicate records before analyzing the dataset. Because the runtime of a database query is determined by the number of records involved, decreasing the number of records decreases the runtime and associated costs, and improves efficiency. In the non-grouping case illustrated in FIG. 4, the global dataset may be analyzed in either a "naïve" (meaning no substantial number of duplicates) pickup global process 410 or in a de-duplicated pickup global process 412. In the grouping case illustrated in FIG. 4, each group may be considered separately and analyzed either as a naïve group (414) or a de-duplicated group (422). Before analysis, however, a determination may be made as to whether the groups are small or large at 416 and 424. Depending upon whether the size of a group, different pickup processes may be used. For the naïve groups, if the groups are large a naïve pickup hash analysis process is preferably employed, as shown at 418, whereas if the groups are small a naïve pickup sort analysis process may be employed, as indicated at 420. Similarly, for de-duplicated groups, a de-duplicate pickup hash analysis process may be employed for large groups (426), and a de-duplicate pickup sort analysis process may be employed for small groups (428). Preferred embodiments of pickup global, pickup hash, and pickup sort processes in accordance with the invention will be described below.

Figure 5:
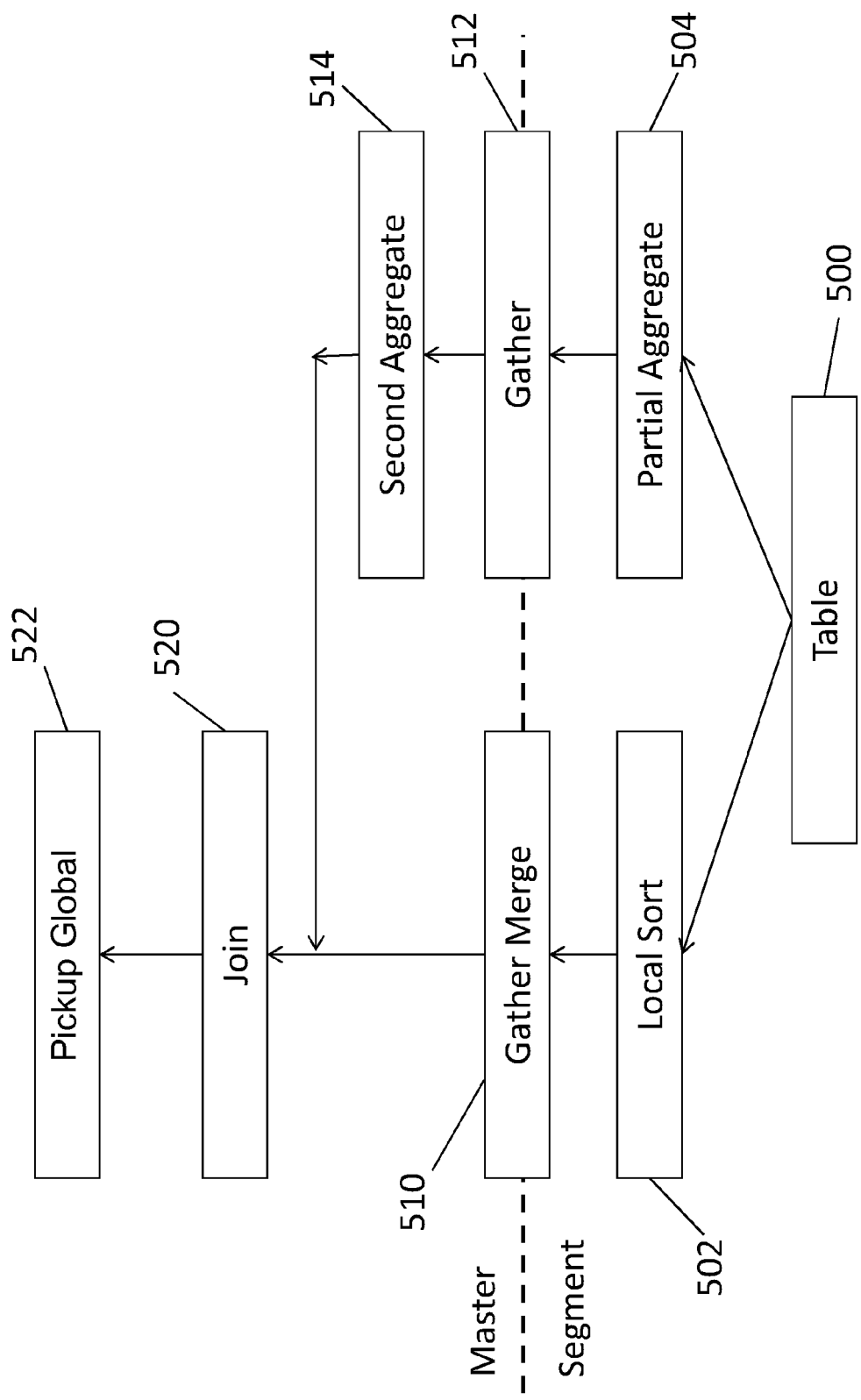
FIG. 5 is a diagrammatic view illustrating an overview of an embodiment of a naïve pickup global process in accordance with the invention for characterizing a dataset using an inverse distribution operation.

FIG. 5 illustrates a non-group naïve pickup global process 410 in accordance with a preferred embodiment of the invention. As described above, in a global process one large dataset or group is analyzed. In order to obtain the median, the data values of the records comprising the global dataset must be placed in sorted order, the number of records or rows in the dataset must be counted, and the data value at the designated row number RN selected or determined by interpolation to provide the desired median value. However, in a large parallel distributed database with millions or billions of data records distributed across multiple clusters it has been impractical, inefficient and costly to perform these operations on one large consolidated dataset. A pickup global process in accordance with the invention as illustrated in FIG. 5 avoids these difficulties.

As shown in FIG. 5, in an embodiment of the pickup global process in accordance with the invention, a first portion of the process is performed in each of the segments of the database cluster, and a second portion of the process is performed by the master host of the database cluster. The first and second portions of the process that are performed in the segments and the master are indicated by the separating dashed line in FIG. 5. In a first segment of the database, a local sort is performed at 502 on a relevant dataset in a table 500 to place the relevant data into sorted order, e.g., numerical order. Simultaneously with performing the local sort, a partial aggregate or count of the number of data elements in the local dataset on the first segment may be performed in parallel at 504 as the data is sorted. The sorted local data may be supplied to a gather merge module 510 on the master node. Separately, a partial aggregate or count of the number of data elements or rows in the sorted data may be produced at 504 and supplied to another gather module 512 on the master. The gather merge module 510 receives the sorted local data from the first segment and may place it into a first container on the master corresponding to the first segment. The gather module 512 may likewise gather or collect on the master the partial aggregate or count of the number of data elements of the sorted data in the first container. These steps may then be repeated for each of the other segments in the database cluster, resulting in a plurality of sort ordered local datasets in separate containers on the master with counts of the numbers of data elements in each dataset. A second aggregate process 514 may be performed on the master to sum the various counts from the gather module 512 for the plurality of locally sorted datasets in the gather module 510 to give the total number of data elements or rows in the global dataset comprising a plurality of local datasets from the various segments. This total may be supplied to a join module 520 on the master.

After gathering the local data sorts from the segments, the gather merge module 510 streams a sort ordered global dataset to join module 520 by selecting data elements in sorted order from the sorted local datasets in the various containers. Since each of the local datasets has already been placed in sorted order in its respective container, the merge function of module 510 need only scan the plurality of containers and select the next sequentially ordered data element in the global dataset, e.g., the next largest data value for a dataset ordering of smallest to largest values, and stream the selected data element to the join module 520. The join module 520 supplies the total count of data elements or rows in the global dataset from the second aggregate process 514 to the pickup global module 522 along with the ordered data elements streamed by the merge operation of module 510. The pickup global module may pick up the data value at the row number RN corresponding to the middle row of the ordered global dataset to supply the median value. Since the count of the total number of rows in the global dataset is known as a result of the second aggregate process 514, the row number for the median value is readily determined. Accordingly, once the pickup global process 522 receives the data value corresponding to the calculated row number RN for the median (or the adjacent rows where RN falls between rows), the pickup global process can supply the answer for the median value without needing to receive the remaining half of the ordered global dataset. Thus, the process can be terminated, thereby reducing processing costs by at least one-half and improving efficiency.

For percentile levels other than the median, even greater efficiencies may be achieved. The $90^{th}$ percentile level, for example, seeks the data value that is equal to or greater than 90% of the values in the dataset. This may be determined either by counting upwards from the bottom row (smallest value) in the ordered data set to the row that is 90% of the way to top of the dataset, or by counting down from the top 10% of the way to the bottom. Accordingly, by streaming the data in inverse order from the highest value to the lowest, and knowing the total number of rows, data streaming may be terminated at the correct row after streaming only 10% of the data.

Figure 6:
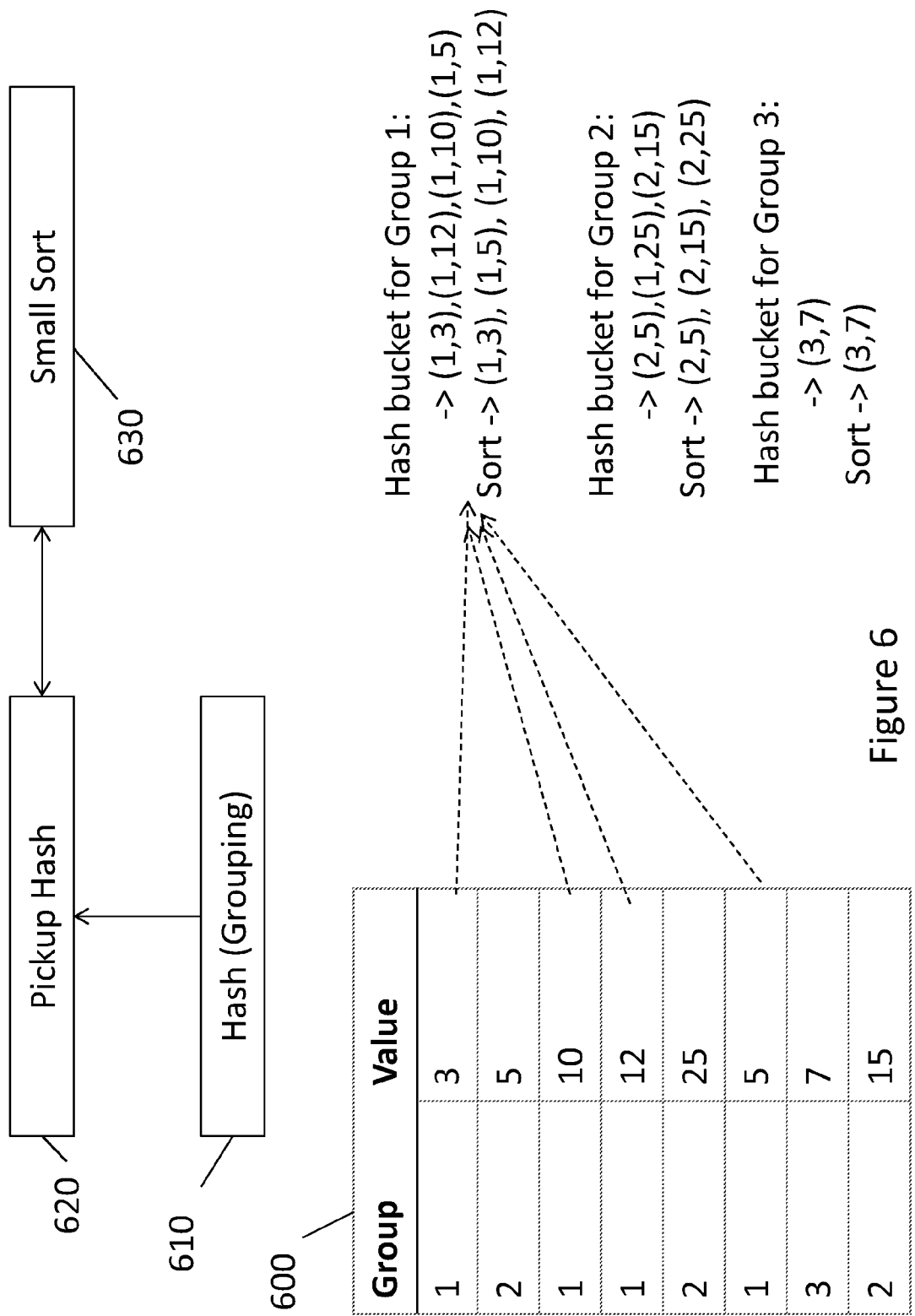
FIG. 6 is a diagrammatic view illustrating an overview of an embodiment of a pickup hash process in accordance with the invention for characterizing a dataset using an inverse distribution operation.

FIG. 6 is an overview of an embodiment of a pickup hash process in accordance with the invention. In this process, values in a dataset may first be partitioned into groups using queries having partitioning keys to produce partitioned data 600. The data may be then subjected to a hashing process 610 which stores the data values in hash buckets or containers for each group based upon the partitioning keys. A small sort 630 may be performed of each group to produce a sorted group dataset while simultaneously counting the number of values in the group. The sorted groups may then be streamed to a pickup hash operation 620 which uses the count and the previously described inverse distribution operation to pick up a data value corresponding to a desired percentile level. FIG. 6 illustrates the pickup hash process for three groups. As shown, unordered values 3, 12, 10 and 5 of Group 1 may be placed in a corresponding hash bucket by process 610 as tuples (group_key1, valueV), and the hash bucket values may be sorted to produce the sort ordered values 3, 5, 10 and 12 for the group, which may be streamed to the pickup hash operation 620 for selection of the value at the desired percentile level. The process may then be repeated for the remaining Groups 2 and 3, as indicated. This results in three data values, one for each group, corresponding to the desired percentile level for each group.

Figure 7:
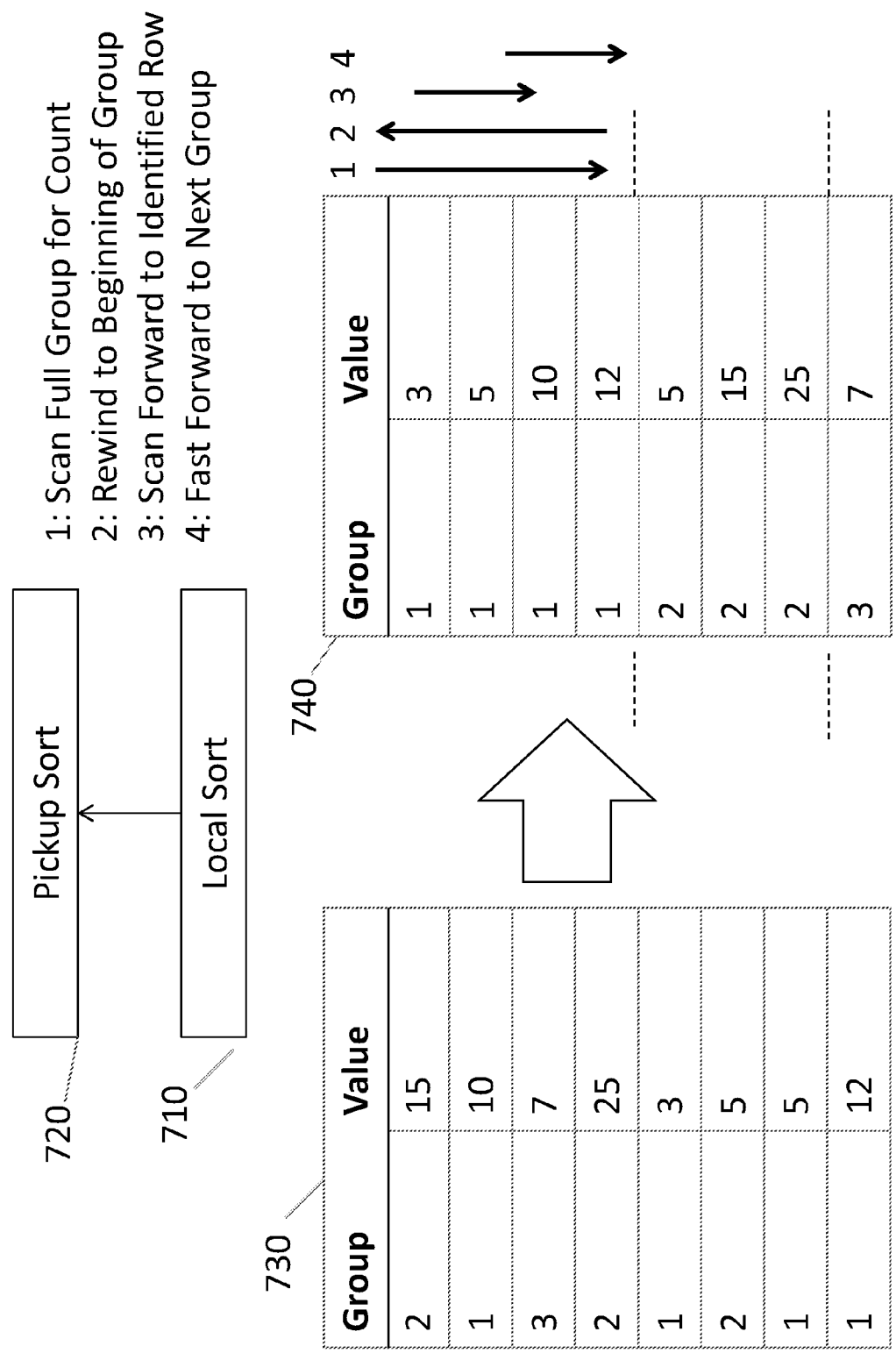
FIG. 7 is a diagrammatic view illustrating an overview of an embodiment of a pickup sort process in accordance with the invention for characterizing a dataset using an inverse distribution operation.

FIG. 7 illustrates an overview of an embodiment of a pickup sort process in accordance with the invention. In the pickup sort process, records are sorted across groups by a local sort process 710, and streamed to a pickup sort operation 720. A full dataset 730 may be sorted to produce a dataset 740 sorted by group, as shown. The sorted dataset of a group, e.g., Group 1, may then be scanned to determine a count of the number of data elements in the group, as shown at step 1 in the figure. In step 2, the process may return to the beginning of the group, and in step 3 the group may be scanned forward to identify the designated row number, RN, which may be picked up by the pickup sort process 720. At step 4, the process fast forwards to the next group, i.e., Group 2, and repeats.

As shown in FIGS. 6 and 7 the pickup hash and the pickup sort processes are somewhat similar. They differ in that the pickup hash first hashes data into groups before sorting, and is better suited to a large number of groups since each sort is more likely to fit in memory. In contrast, the pickup sort across groups directly is better suited to a smaller number of groups. If values in a group are duplicated, efficiencies can be gained in any of the grouped and non-grouped pickup processes of the invention by compressing streamed data in a de-duplication process using run length encoding. Run length encoding can significantly reduce the amount of data that is transported and the cost of a runtime operation. Run length encoding may be performed on groups in parallel, where identical values may be packed into one value without moving data, and the results of the compression may be merged after moving.

Figure 8:
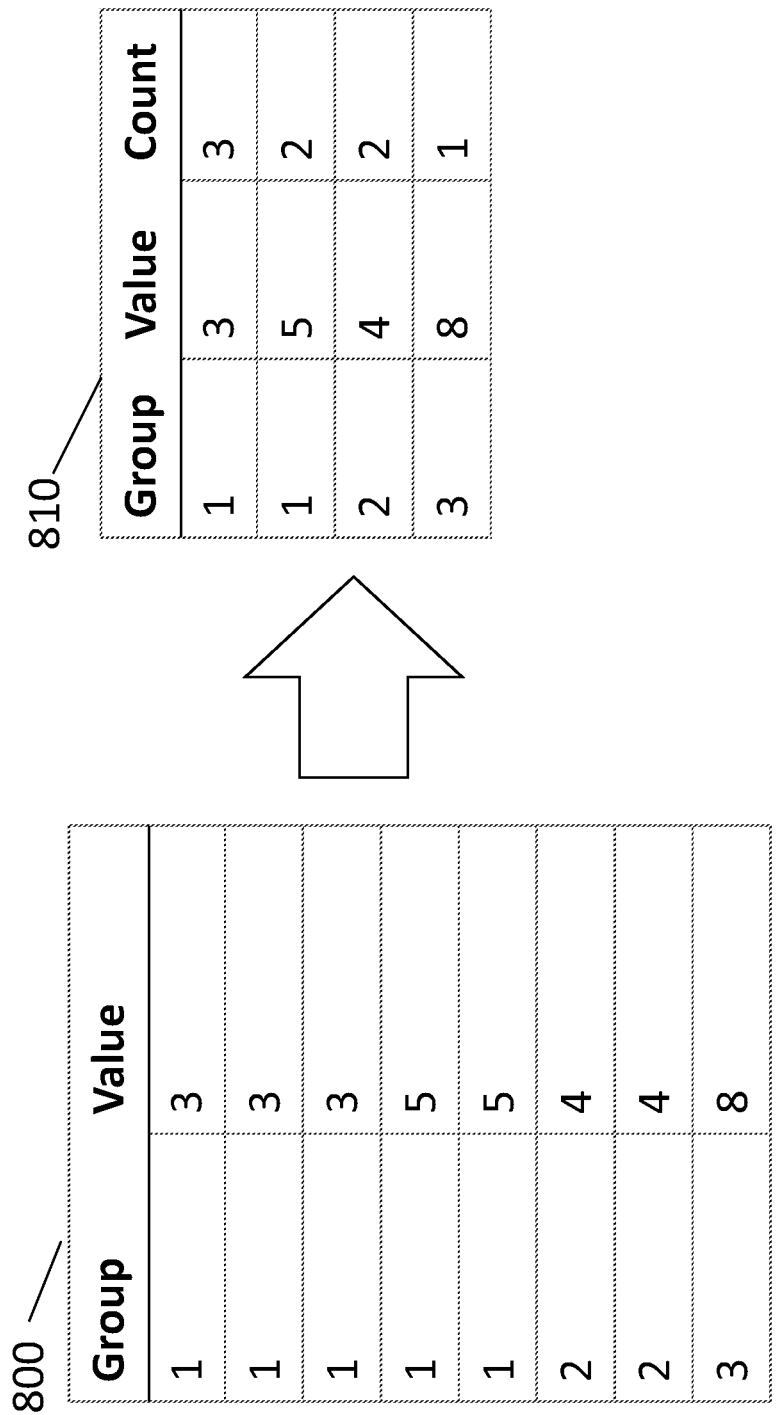
FIG. 8 is a diagrammatic view illustrating a de-duplication process in accordance with the invention.

FIG. 8 illustrates the results of an embodiment of a de-duplication process in accordance with the invention. First, a dataset 800 may be organized into groups using queries and partitioning keys to produce tuples (key1, value1), (key1, value2), ... (keyN, valueM), where the keys correspond to the groups and the values are the data values in the group. Running counts of identical data values in each group may be produced as the dataset 800 is formed, and dataset 800 may then be compressed into a smaller dataset 810, where each record (key1, value1, count1), (key1, value2, count2), ... (keyN, valueM, countNM) of dataset 810 indicates its group, its value, and a count of the number of identical values in the group. As shown, compressed dataset 810 is substantially smaller than dataset 800. Accordingly, it requires less time, network bandwidth and cost to move dataset 810 across a network and process it. For a dataset containing, for example, millions of records of which only several thousands have unique values, the efficiencies and savings can be substantial.

Figure 9:
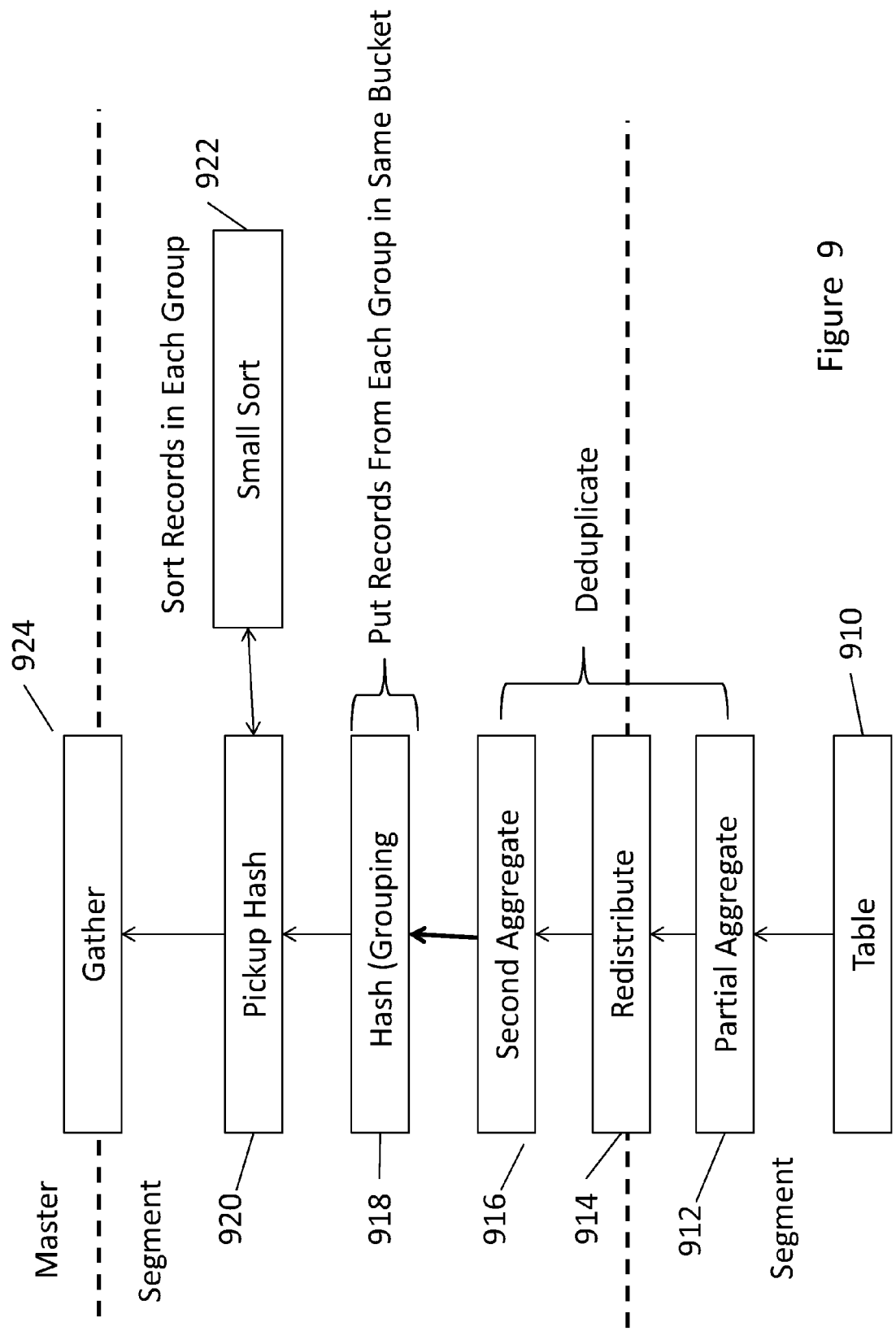
FIG. 9 is a diagrammatic view illustrating an embodiment of a pickup hash process in accordance with the invention that incorporates de-duplication.

FIG. 9 illustrates in detail a pickup hash process in accordance with the invention that embodies de-duplication. Process modules 918, 920 and 922 correspond generally to process modules 610, 620 and 630, respectively of FIG. 6, and process modules 912, 914 and 916 comprise the de-duplication process. The process operations illustrated in FIG. 9 are performed on the different segments, and the results are gathered by a gather process 924 at the master node. Referring to FIG. 9, a dataset in the form of a plurality of tables 910 may be distributed across different segments. Each segment may perform a partial aggregation 912 that collects the data into various groups on each segment and may simultaneously count the number of elements in each group. At 914, the segments may redistribute the partially aggregated data from the tables and counts to different segments in order to consolidate data of a group from across the different segments onto one segment. This has the advantage of putting all of relevant data for each group together on one segment. Each segment may then perform a second aggregate operation 916 to sum the group counts from the various segments to obtain a total count of the group. At 918, a hashing operation, as previously described, is performed to put records for the same group in the same container or hash bucket, and pickup hash and small sort processes as previously described may be performed at 920 and 922 to sort the values in each hash bucket or group and to pick up the values of the sorted data of each group. The values picked up on the various segments comprising the desired percentile values of each group are gathered at 924 on the master segment, from which they may be reported.

Figure 10:
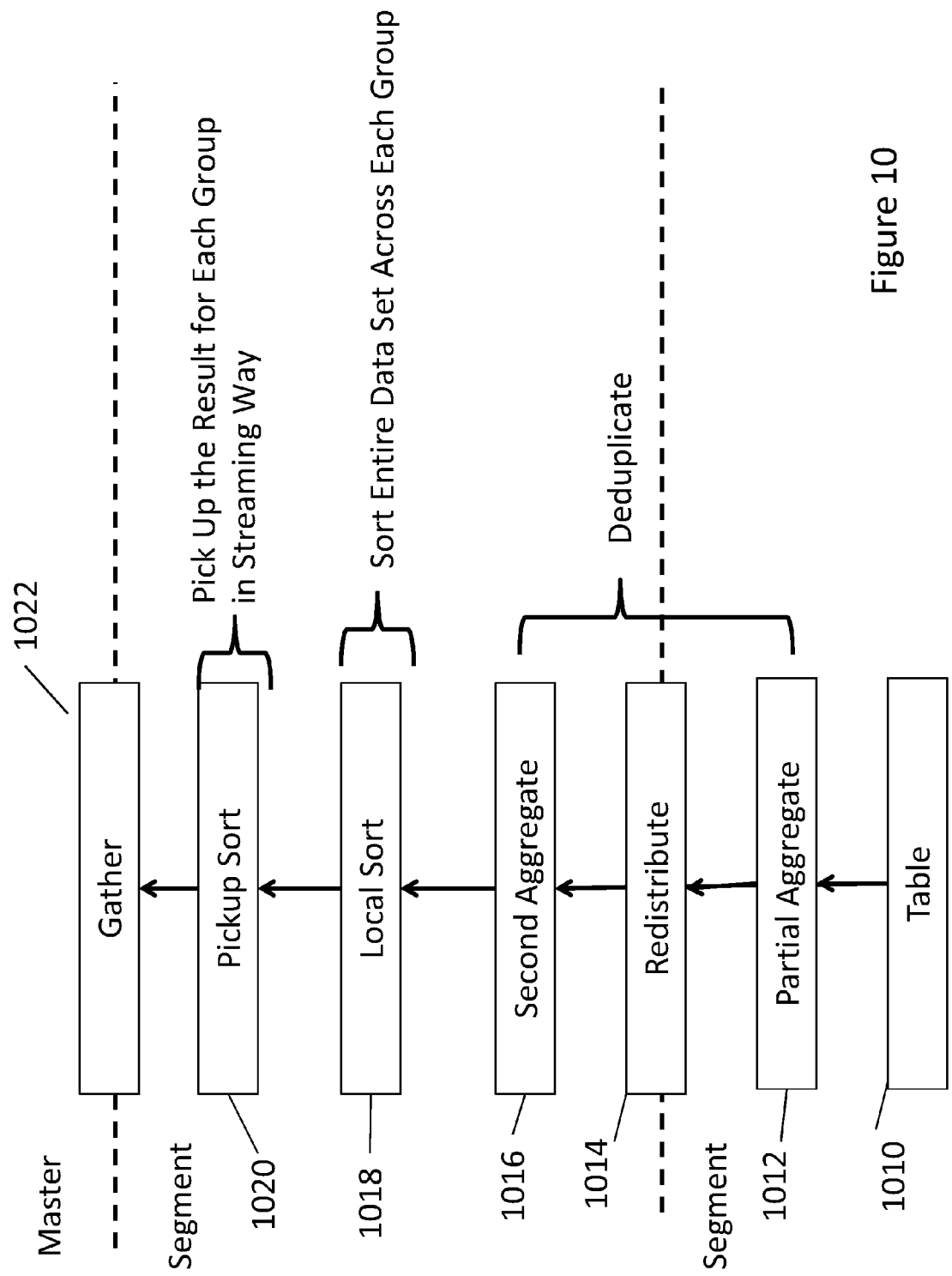
FIG. 10 is a diagrammatic view illustrating an embodiment of a pickup sort process in accordance with the invention that incorporates de-duplication.

FIG. 10 illustrates in detail a pickup sort process in accordance with the invention that embodies de-duplication. The pickup sort process of FIG. 10 is similar to the pickup hash process of FIG. 9, except that the pickup hash process first hashes data in a dataset according to group. As with the pickup hash process, portions of the pickup sort process may be performed on different segments.

Referring to FIG. 10, a dataset comprising a plurality of tables 1010 may be distributed across different segments, and operations 1012 (partial aggregate), 1014 (redistribute) and 1016 (second aggregate) comprising the de-duplication process which may be substantially the same as described in connection with FIG. 9 may be performed. Unlike the pickup hash process which hashes data into groups, the local sort operation 1018 sorts the entire dataset across each group in a manner similar to that described in FIG. 7, and the pickup sort process 1020 picks up the results for each group in a streaming way and supplies the results to a gather process 1022 on the master node which may report the results. As described above in connection with the pickup global process, once the master receives the data value corresponding to the desired percentile, the process may terminate.

Figure 11:
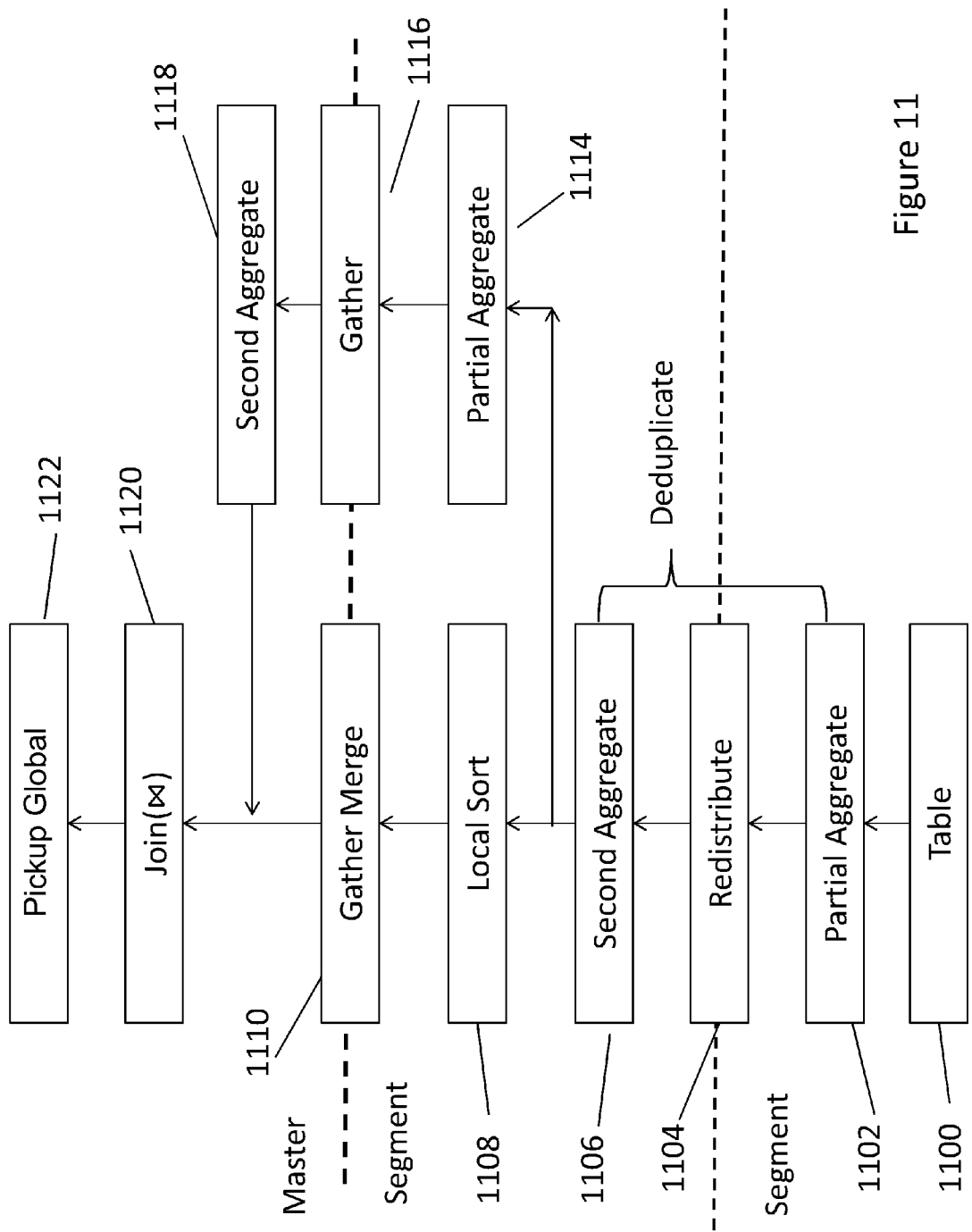
FIG. 11 is a diagrammatic view illustrating an embodiment of a pickup global process in accordance with the invention that employs de-duplication.

Finally, FIG. 11 illustrates an embodiment of the pickup global process of FIG. 5 that includes a de-duplication process (elements 1102, 1104 and 1106) such as described in connection with FIGS. 9 and 10. The remaining operations 1108, 1110, 1114, 1116, 1118, 1120, and 1122 illustrated in the figure may be substantially the same as the operations 502, 510, 504, 512, 514, 520, and 522, respectively, described above in connection with FIG. 5.

From the foregoing it can be seen that the inverse distribution operations of the invention for both group and non-grouped datasets as well as for large and small datasets all involve placing the data values of a dataset into sorted order, determining the row number of the row containing the data value corresponding to the desired percentile level, and picking up the data value using a pickup operation to supply the answer. The invention is unique and highly advantageous in the manner in which it derives the information to characterize a dataset of a large parallel distributed database by arranging data from across multiple segments of a distributed parallel database cluster into small groups at single locations, to sort order of the data and to pickup the relevant data values, or otherwise picking up one or more relative values as data is streamed from distributed segments to a single location. Thus, the invention allows characterization of a large distributed dataset to be performed efficiently and cost-effectively.

While the foregoing has been with respect to preferred embodiments of the invention, it will be appreciated by those skilled in the art that changes in these embodiments may be made without departing from the principles and spirit of the invention, the scope of which is defined in the appended claims.

The invention claimed is:

1. A method, comprising:
receiving a query that identifies a percentile value, information identifying a dataset stored in a database system, and one or more groups of a plurality of data elements included in the dataset, wherein each data element includes a data value, and wherein the database system comprises a plurality of segment nodes each storing a segment of the dataset and each networked to a master node, wherein each node comprises a computer system;
for each group identified by the query:
sorting data elements in the group in each segment node in parallel to generate a respective sorted segment dataset in each segment node,
storing the sorted dataset segment from each segment node in a respective container on a same segment node,
determining a count of the number of data elements in the group,
at the same segment node, streaming one data element at a time from any of the sorted dataset segments in order of data value of each data element, and
picking the data value corresponding to the percentile value from the streaming data elements using the count; and
providing the picked data value from each group to the master node.

2. The method of claim 1, further comprising:
grouping the plurality of data elements in each segment node comprising:
hashing the plurality of data elements into hash buckets, wherein each hash bucket identifies a group.

3. The method of claim 1, further comprising:
grouping the plurality of data elements by querying the plurality of data elements included in the plurality of segment nodes using partitioning keys to partition the plurality of data elements into the one or more groups identified by the query.

4. The method of claim 1, wherein determining a count comprise:
sorting, in each segment node, the plurality of data elements included in each dataset segment in parallel and determining a segment count of the sorted plurality of data elements included in each dataset segment; and
providing the segment counts to the same segment node and computing, at the same segment node, an addition of each segment count.

5. The method of claim 1 further comprising performing a de-duplication process on data elements in the one or more groups, wherein the process comprises determining counts of same data elements.

6. The method of claim 1, further comprising:
for each group:
determining that the percentile value is greater than fifty percentile and identifying a particular number of data elements to stream by computing a subtraction of the count from a product of the percentile value times the count; and
at the same segment node, streaming one data element at a time from any of the sorted dataset segments in descending order of data value of each data element.

7. The method of claim 6, further comprising:
terminating the streaming of data elements upon streaming the particular number of data elements.

8. The method of claim 1, further comprising:
for each group:
determining that the percentile value is less than fifty percentile and identifying a particular number of data elements to stream by computing a product of the percentile value times the count; and
at the master node, streaming one data element at a time from any of the sorted dataset segments in ascending order of data value of each data element.

9. The method of claim 8, further comprising:
terminating the streaming of data elements upon streaming the particular number of data elements.

10. A method comprising:
receiving a query that identifies a percentile value, information identifying a dataset stored in a database system that comprises a plurality of data elements, wherein each data element includes a data value, and wherein the database system comprises a plurality of segment nodes each storing a dataset segment of the dataset and each networked to a master node;
sorting the plurality of data elements included in each dataset segment in parallel to generate a respective sorted dataset segment included in each segment node;
storing the respective sorted dataset segments from each segment node on the master node and determining a count
of all the plurality of data elements;
at the master node, streaming one data element at a time from any of the sorted dataset segments in order of data value of each data element; and
picking the data value corresponding to the percentile value from the streaming data elements using the count.

11. The method of claim 10 further comprising:
determining that the percentile value is less than fifty percentile and identifying a particular number of data elements to stream by computing a product of the percentile value times the count; and
at the master node, streaming one data element at a time from any of the sorted dataset segments in ascending order of data value of each data element.

12. The method of claim 11 further comprising:
terminating the streaming of data elements upon streaming the particular number of data elements.

13. The method of claim 10 further comprising performing a de-duplication process on the data elements, wherein the process comprises determining counts of same data elements.

14. The method of claim 10 further comprising:
determining that the percentile value is greater than fifty percentile and identifying a particular number of data elements to stream by computing a subtraction of the count from a product of the percentile value times the count; and
at the master node, streaming one data element at a time from any of the sorted dataset segments in descending order of data value of each data element.

15. The method of claim 14 further comprising:
terminating the streaming of data elements upon streaming the particular number of data elements.

16. The method of claim 10, wherein determining a count of all the plurality of data elements comprises:
sorting, in each segment node, the plurality of data elements included in each dataset segment in parallel and determining a segment count of the sorted plurality of data elements included in each dataset segment; and
providing the segment counts to the master node and computing, at the master node, an addition of each segment count.

17. Computer readable non-transitory storage medium embodying instructions for controlling the operation of a database system comprising instructions for:
receiving a query that identifies a percentile value, information identifying a dataset stored in a database system, and one or more groups of a plurality of data elements included in the dataset, wherein each data element includes a data value, and wherein the database system comprises a plurality of segment nodes each storing a segment of the dataset and each networked to a master node, wherein each node comprises a computer system;
for each group identified by the query:
sorting data elements in the group in each segment node in parallel to generate a respective sorted segment dataset in each segment node,
storing the sorted dataset segment from each segment node in a respective container on a same segment node,
determining a count of the number of data elements in the group,
at the same segment node, streaming one data element at a time from any of the sorted dataset segments in order of data value of each data element, and
picking the data value corresponding to the percentile value from the streaming data elements using the count; and
providing the picked data value from each group to the master node.

18. Computer readable medium of claim 17 further comprising instructions for performing a de-duplication process on the data elements, wherein the process comprises determining counts of same data elements.

19. Computer readable medium of claim 17, further comprising instructions for:
for each group:
determining that the percentile value is greater than fifty percentile and identifying a particular number of data elements to stream by computing a subtraction of the count from a product of the percentile value times the count; and
at the same segment node, streaming one data element at a time from any of the sorted dataset segments in descending order of data value of each data element.

20. Computer readable medium of claim 17, further comprising instructions for:
for each group:
determining that the percentile value is less than fifty percentile and identifying a particular number of data elements to stream by computing a product of the percentile value times the count; and at the master node, streaming one data element at a time from any of the sorted dataset segments in ascending order of data value of each data element.

* * * * *